No. 789,190. PATENTED MAY 9, 1905.
T. J. WADDELL.
SCRAPER.
APPLICATION FILED MAY 11, 1904.

3 SHEETS—SHEET 1.

Fig. 1.

Witnesses

Inventor
Thomas J. Waddell.
By Victor J. Evans
Attorney

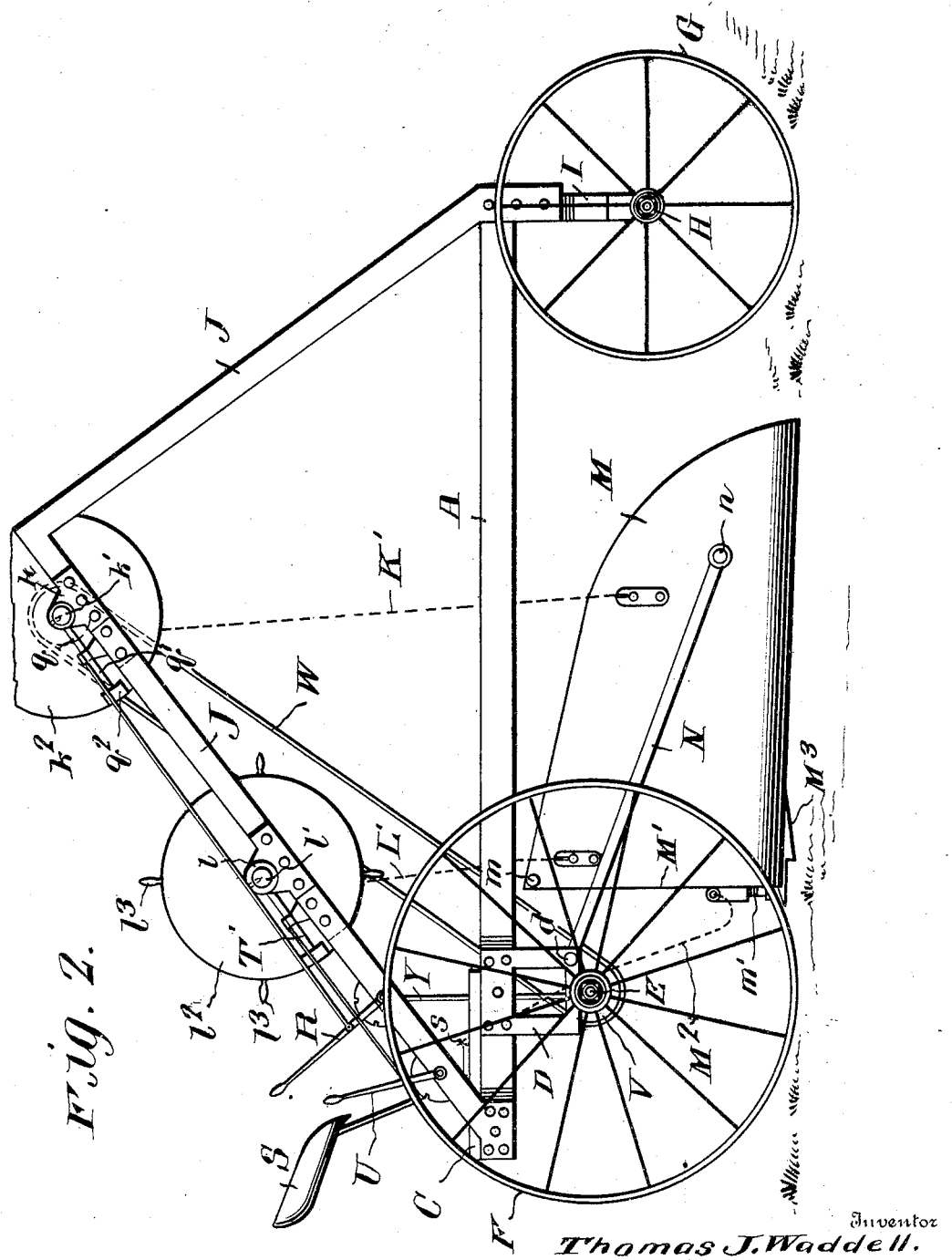

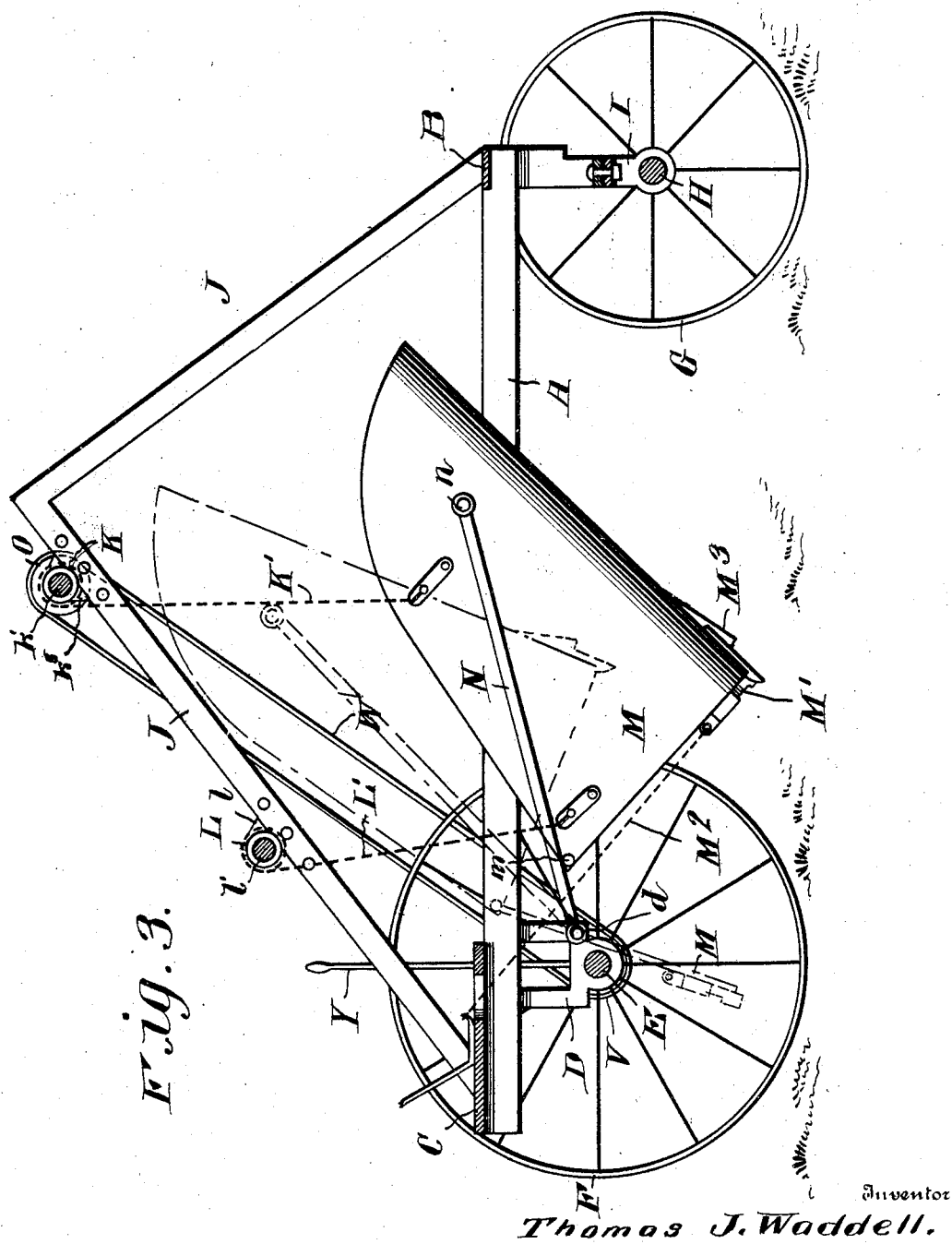

No. 789,190.

Patented May 9, 1905.

UNITED STATES PATENT OFFICE.

THOMAS J. WADDELL, OF PHILBROOK, MONTANA.

SCRAPER.

SPECIFICATION forming part of Letters Patent No. 789,190, dated May 9, 1905.

Application filed May 11, 1904. Serial No. 207,477.

*To all whom it may concern:*

Be it known that I, THOMAS JEFFERSON WADDELL, a citizen of the United States, residing at Philbrook, in the county of Fergus and State of Montana, have invented new and useful Improvements in Scrapers, of which the following is a specification.

This invention relates to a self-loading vehicle in which a suitably-constructed frame, supported on wheels, carries a pivoted scoop or shovel adapted to collect material from the ground and when filled to have its forward end or mouth elevated by mechanical means under the control of an operator into such position that without dropping its contents it may be hauled away. After reaching the place where the material is to be dumped the operator lowers the rear of the shovel, causing a pivoted door forming its rear end to be automatically unlocked by the movement and thrown open by the weight of the material resting thereon.

The arrangement of my invention is such that the load in the shovel may be emptied in a single pile or be spread out over the ground.

All the operations necessary to a proper working of my invention are under the control of one man seated at the rear of the vehicle, who may also be in charge of the animals drawing the vehicle.

In the accompanying drawings, Figure 1 represents a plan view of my invention. Fig. 2 is a view of the same in side elevation, the shovel being in its operative position. Fig. 3 is a longitudinal sectional view on the line 3 3, the shovel being raised from the ground.

Similar letters of reference indicate the same parts in the several figures.

A A indicate the side bars of the vehicle-frame, connected together at the front by a cross-bar B and at the rear by a platform C. Depending from the side bars A near the rear of the machine are hangers D, carrying bearings for the rear axle E, on which supporting-wheels F F are mounted. The front wheels G G are carried by a vertically-pivoted axle H in well-known manner at the forward end of the vehicle.

Bolted or riveted to each side bar A and rising upwardly therefrom is an angular or arch frame J, between which frames and journaled thereon near their upper ends, is a winding-drum K; a similar drum L is also carried by the arch-frames J, but lower down thereon toward the rear of the machine. From the winding-drums K and L chains K' and L' depend, from which a shovel M is suspended and braced against rearward movement by a thrust-bar N on each side. These bars also prevent the shovel from swinging in a forward and backward direction and from undue side motion. To one of the angle or arch bars J is riveted two bearings $k$ and $l$, supporting fixed stud-shafts $k'$ $l'$, on which one end of the respective drums K L are journaled, the opposite ends of the drums rotating on similar bearings $k^5$ $l^5$ on the other arch-bar J. The stud-shaft $k$ is feathered for one part of a sliding clutch P, the other part being attached to the drum K. Pivoted on the arch-bar J near the clutch P is a three-armed lever Q. One arm, $q$, which may be a spring-arm, engages the sliding part of the clutch to throw it into and out of connection. The second arm, $q'$, carries a shoe $q^2$, arranged to bear against a friction-disk $k^2$ on the drum K, while the third arm, $q^3$, is connected to an operating-lever R, pivoted near the seat S. The drum L is provided with a similar clutch T, three-armed lever T', and friction-disk $l^2$, the latter having on its periphery handles $l^3$, by which the drum may be rotated. An operating-lever U for moving the clutch T is placed near the lever R. A sprocket-wheel V, rotatably carried by the rear shaft E, is geared to a similar wheel O on the shaft of the drum K by a sprocket-chain W.

X indicates a clutch, one part being attached to the sprocket-wheel V, the other part carried by the rotating shaft E, or, if the latter be fixed, by the rear wheel F near it. A lever Y on the left of the machine and under the control of the occupant of the seat is employed to operate the clutch X.

The scoop or shovel M is of U shape in cross-section, having an open top and front and its rear end closed by a swinging door M', pivoted at $m$ to the upper rear corners of the shovel sides. A latch $m'$ is fastened to the bottom of the swinging door to hold it closed. A chain M², connected to the latch, has its other end caught over a hook S on the platform C. The thrust-bars N are pivoted at n to the shovel and to the hangers at d. Shoes M³ are riveted to the bottom of the shovel at its rear to ease its travel over the ground and to slightly elevate its rear end that the point may better take up the load.

In operation the vehicle will be adjusted as shown in Fig. 2, the point of the shovel resting on the ground and its rear end slightly raised by the shoes. The vehicle is drawn forward, usually by animal power, until the shovel entering the previously-loosened earth is filled. The clutch X is by means of the lever Y thrown into engagement, which causes the sprocket-wheel to rotate with the rear wheel F, and through the connections described, the drum K is rotated, winding the chains K' thereon, and raising the point of the shovel M, as shown in Fig. 3. The clutch X is then disengaged. The clutch P, which had yielded as the drum turned, now prevents it from unwinding under the weight of the load. The shovel being loaded and raised, the vehicle is drawn to the dumping-ground and there discharged. If the material is to be spread out, the shovel remains about in the position indicated in Fig. 3, so that the load will run out gradually; but if the material is to be left in a pile the point of the shovel must be raised higher, as represented in dotted lines in the aforesaid figure, in which position of the shovel the load will be discharged in bulk. To dump the load, whatever the position of the shovel the lever U is moved to disengage the clutch T on the drum L, at the same time applying the brake-shoe on the bell-crank lever T' against the side of the friction-disk l². The drum will then slowly unwind, lowering the rear end of the shovel until the chain M² tightens and withdraws the bolt m' from its keeper, thereby freeing the swinging door M', which will open immediately, and the load falls from the shovel. The rear of the shovel is then raised by turning the friction-disk l² to wind the chain L' on the drum L and its point lowered by moving the lever R to disengage the clutch P. The shoe q² by this operation is caused to bear on the friction-disk k² and prevent a too rapid rotation of the drum K.

Having thus described the invention, what is claimed as new is—

1. Combined in a self-loading vehicle, a shovel or scoop, winding-drums, a chain or its equivalent for suspending each end of said shovel from a winding-drum, and means operated by the running-gear of the vehicle for raising one end only of said shovel.

2. Combined in a self-loading vehicle, a shovel or scoop, winding-drums, a chain or its equivalent for suspending each end of said shovel from a winding-drum, means operated by the running-gear of the vehicle for raising one end only of said shovel, and a clutch mechanism between said running-gear and said operating means.

3. Combined in a self-loading vehicle, a shovel or scoop, winding-drums, suspending-chain extending from the forward end of said scoop to a winding-drum, power-operated means for winding one drum, and manual means for turning the other drum.

4. Combined in a self-loading vehicle, a shovel or scoop, winding-drums, suspending-chain extending from said shovel to the winding-drums, power-operated means for winding one drum, manual means for rotating the other drum, means for holding said drums against backward rotation, and means for releasing either of said drums and simultaneously applying a braking device to said released drum.

5. Combined in a self-loading vehicle, a shovel or scoop, winding-drums, suspending means from each end of the shovel to a winding-drum, a door pivoted to the shovel and held closed by a latch, means for winding the drums, and means for automatically unlatching the door when the rear of the shovel is lowered.

6. Combined in a self-loading vehicle having a frame and running-gear, a shovel or scoop, winding-drums, suspending means from each end of said shovel to a winding-drum, a sprocket-wheel, a clutch adapted to connect the sprocket-wheel to the clutch, chain-gearing between the sprocket-wheel and one of the drums for winding said drum, a clutch mechanism for holding said drum when wound and a manually-operated lever for disengaging said clutch and braking the speed of said drum when unwinding.

7. Combined in a self-loading vehicle, a shovel or scoop, winding-drums, suspending means from each end of the shovel to a drum, means for separately winding said suspending means on said drums, means for holding said drums against rotation when wound, and independent means for disconnecting said drums and applying a speed-braking device thereto.

8. Combined in a self-loading vehicle, a shovel or scoop, a winding-drum, suspending means between the winding-drum and the shovel, means for winding said suspending means on said drum, a door pivoted to said scoop, a latch for fastening the door closed, and a connection between the latch and the vehicle.

9. Combined in a self-loading vehicle, a shovel or scoop, means for suspending and elevating said shovel, and thrust-bars pivoted to the shovel and to the vehicle.

In testimony whereof I affix my signature in presence of two witnesses.

THOMAS J. WADDELL.

Witnesses:
WILLIAM A. PECK,
H. G. PHILLIPS.